United States Patent
Park et al.

(10) Patent No.: US 7,200,429 B2
(45) Date of Patent: Apr. 3, 2007

(54) MOBILE TERMINAL AND HINGE DEVICE THEREOF

(75) Inventors: Sung-Sun Park, Kumi-shi (KR); Jong-Gun Bae, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 565 days.

(21) Appl. No.: 10/287,148

(22) Filed: Nov. 4, 2002

(65) Prior Publication Data

US 2004/0203517 A1  Oct. 14, 2004

(30) Foreign Application Priority Data

Jul. 23, 2002  (KR) .............................. 2002-43417

(51) Int. Cl.
*H04M 1/00* (2006.01)
*H04B 1/38* (2006.01)

(52) U.S. Cl. ................. 455/575.4; 455/90.1; 455/90.3; 455/550.1; 455/566; 455/575.1; 379/433.12; 379/433.13

(58) Field of Classification Search ............. 455/550.1, 455/575.1, 575.3, 575.4, 90.1, 90.3, 566; 379/433.06, 433.04, 433.13
See application file for complete search history.

(56) References Cited

U.S. PATENT DOCUMENTS 6,748,242 B1 * 6/2004 Dunleavy ................... 455/566

2003/0078069 A1 * 4/2003 Lindeman ................... 455/550

FOREIGN PATENT DOCUMENTS

WO   WO 98/19434   *  5/1998

* cited by examiner

*Primary Examiner*—Matthew D. Anderson
*Assistant Examiner*—Eugene Yun
(74) *Attorney, Agent, or Firm*—The Farrell Law Firm

(57) ABSTRACT

The invention relates to a mobile terminal and hinge device thereof. The mobile terminal comprises: a first keypad disposed with a plurality of keys in the upper face of the main body at one side from a central portion so that the keys can be exposed; a second keypad disposed with a plurality of keys in the upper face of the main body at the other side from the central portion so that the keys can be exposed; and a planar area disposed in the central portion of the upper face of the main body to which the sub-body is rotatably connected, whereby one of the first and second keypads is opened and closed according to rotation of the sub-body. The mobile terminal introduces a novel concept including design by coupling the sub-body to the main body in a manner horizontally rotatable with respect to the upper face of the main body to open/close the keypad at least at one side of the main body. Furthermore, the keypads at both sides can be used together when the sub-body is rotated perpendicular to the main body, allowing more rapid input of information via both keypads and without any additional input device.

4 Claims, 9 Drawing Sheets

FIG.10

MOBILE TERMINAL AND HINGE DEVICE THEREOF

PRIORITY

This application claims priority to an application entitled "Mobile Terminal and Hinge Device Thereof" filed in the Korean Intellectual Property Office on Jul. 23, 2002 and assigned Serial No. 2002-43417, the contents of which are hereby incorporated by reference.

BACKGROUND OF THE INVENTION

1. Field of the Invention

The present invention relates to a mobile terminal, and more particularly, to a mobile terminal having a sub-body rotatable horizontally with respect to a main body, and a hinge device of the mobile terminal.

2. Description of the Related Art

As well known in the art, mobile terminals can be divided into bar, flip and folder type terminals according to their outward appearances.

The bar type terminal has data input/output (I/O) means and transmitting/receiving modules in one body housing. In the bar type terminal, a keypad functioning as data input means is constantly exposed, which increases the potential for malfunction. Further, downsizing thereof is restricted since a predetermined distance is required between transmitting and receiving units.

The flip type terminal comprises a body, a flip and hinge means for connecting the flip to the body. The body has data input/output means and transmitting/receiving modules, and the flip covers a keypad, which functions as the data input means, and prevents malfunction. However, downsizing is also restricted in the flip type terminal since a predetermined distance is required between transmitting and receiving units.

The folder type terminal comprises a body, a folder and hinge means for rotatably connecting the folder to the body so that the folder is rotated to open the folder type terminal. The body has a keypad and a transmitting unit functioning as data input means, and the folder has a display unit and a receiving unit functioning as data output means. The folder closely contacts the body in the standby mode to prevent malfunction, and is unfolded in the conversation mode to ensure sufficient distance between transmitting and receiving units, thereby imparting an advantage of downsizing the folder type terminal.

However, the conventional mobile terminals are restricted to the foregoing bar, flip and folder type terminals. Even recently introduced sliding type terminals fail to satisfy various desires of consumers about terminal designs. Moreover, input means of the mobile terminals are mostly restricted to keypads, which continue to fail to keep up with mobile communication services as they gradually diversify.

SUMMARY OF THE INVENTION

The present invention solves the foregoing problems and provides a mobile terminal and hinge device thereof which comprises a sub-body coupled to a main body in a manner horizontally rotatable with respect to an upper face thereof.

It is another object of the invention to provide a mobile terminal which comprises a sub-body coupled to a central portion of an upper face of a main body and keypads disposed on both sides of the central portion of the upper face of the main body for functioning as input means so that one of the keypads is opened/closed by rotation of the sub-body.

According to an aspect of the invention, there is provided a mobile terminal comprising: a main body; a sub-body coupled to the main body in a slidingly rotatable manner relative to an upper face of the main body; a first keypad disposed with a plurality of keys in the upper face of the main body at one side of the central portion; a second keypad disposed with a plurality of keys in the upper face of the main body at the other side of the central portion; and a planar area disposed in the central portion of the upper face of the main body to which the sub-body is rotatably connected, whereby one of the first and second keypads is opened and closed according to rotation of the sub-body.

According to another aspect of the invention, there is provided a hinge device in a mobile terminal which includes a main body and a sub-body coupled to the main body in a slidingly rotatable manner relative to an upper face of the main body, the hinge device comprising: a first through-hole disposed in an upper housing of the main body; a second through-hole disposed in one side of a lower housing of the sub-body, the second through-hole communicating with the first through-hole in the upper housing of the main body; a first hinge base having a central hinge hole and coupled inside the main body for externally exposing the hinge hole through the first through-hole; a second hinge base rotatable with respect to the first hinge base and having a cylindrical hinge shaft extended from a central portion and opened at both ends, the second hinge base coupled inside the sub-body for projecting the end of the hinge shaft through the second through-hole; and a fastening groove disposed along a circumferential direction in an outer periphery on the end of the hinge shaft, wherein the fastening groove is arranged inside the main body through the hinge hole of the first hinge base and fastened with an E-ring for coupling the sub-body to the main body in a horizontally rotatable manner with respect to the upper face of the main body.

BRIEF DESCRIPTION OF THE DRAWINGS

The above and other objects, features and other advantages of the present invention will be more clearly understood from the following detailed description taken in conjunction with the accompanying drawings, in which:

FIG. 10 is a perspective view of the interior of a main body of the mobile terminal shown in FIG. 1.

DETAILED DESCRIPTION OF THE PREFERRED EMBODIMENTS

The following detailed description presents the preferred embodiments of the invention in reference to the accompanying drawings, and omits well-known functions and constructions to avoid unnecessarily obscuring the description of the invention.

Figure 1:
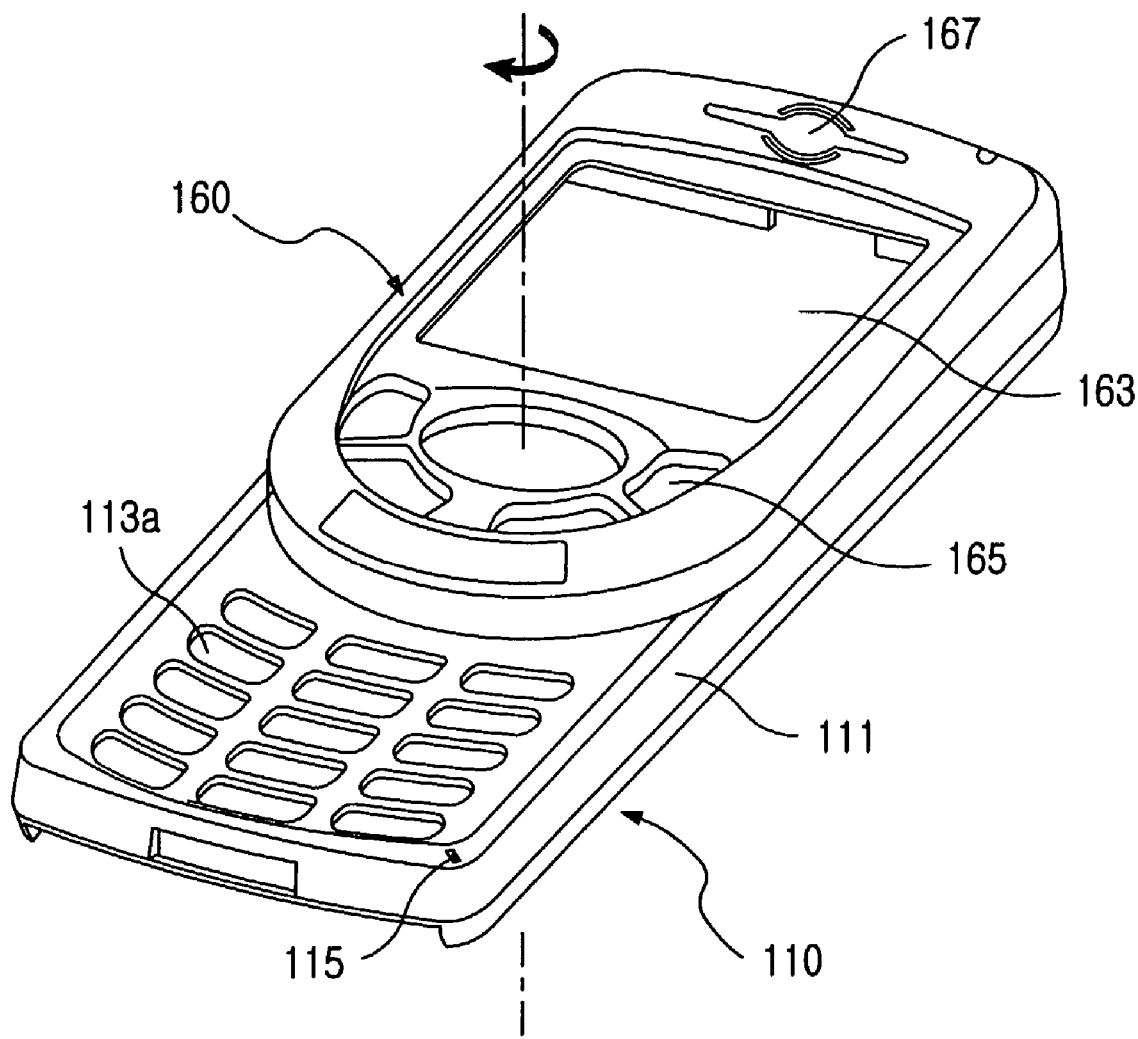
FIG. 1 is a perspective view of a mobile terminal according to a preferred embodiment of the invention.
Figure 2:
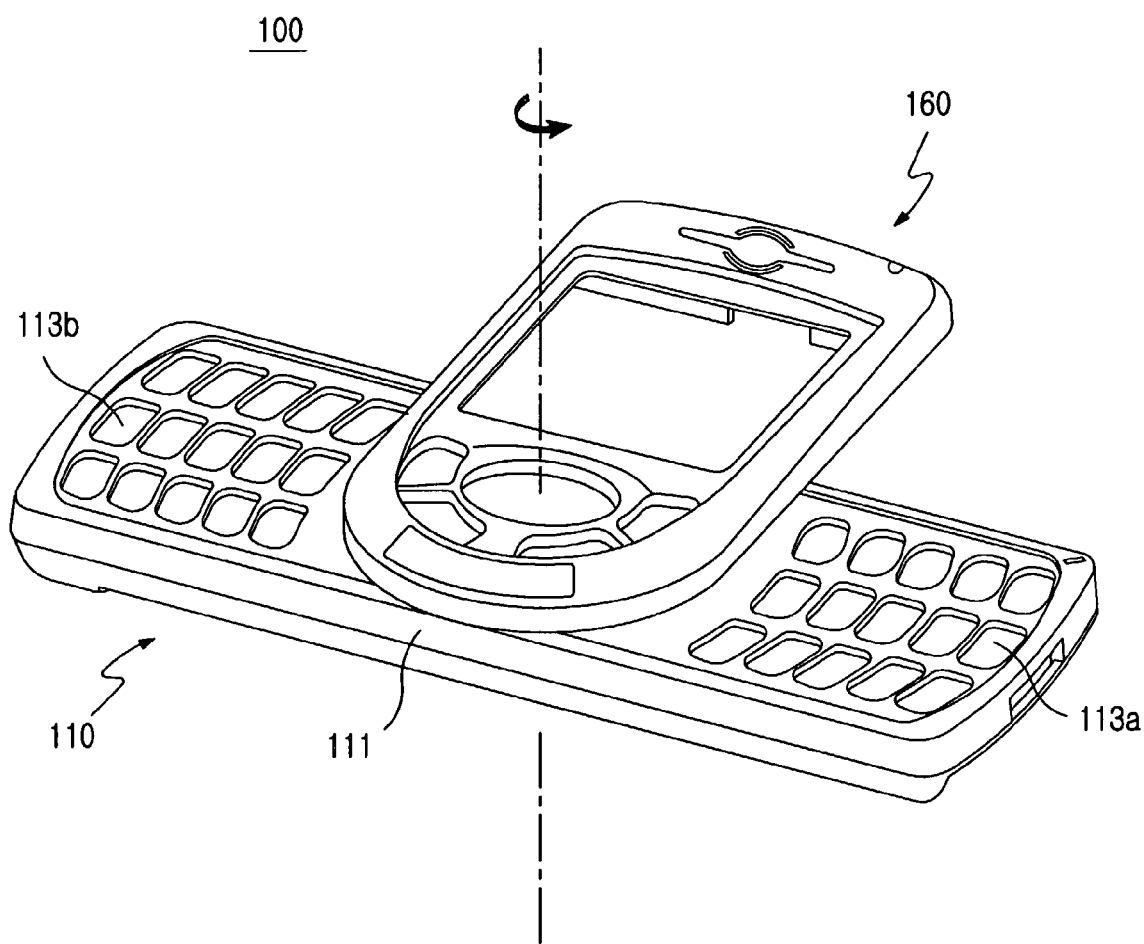
FIG. 2 is a perspective view of the mobile terminal shown in FIG. 1 in which a sub-body is rotated.

FIG. 1 is a perspective view of a mobile terminal 100 according to a preferred embodiment of the invention, and FIG. 2 is a perspective view of the mobile terminal 100 shown in FIG. 1 in which a sub-body 160 is rotated.

As shown in FIGS. 1 and 2, the mobile terminal according to the preferred embodiment of the invention comprises a main body 110 and the sub-body 160.

The main body 110 has first and second keypads 113a and 113b on the upper face and a transmitting unit 115 which is internally equipped with a microphone in a position corresponding to the first keypad 113a. The sub-body 160 is rotatably coupled to a central portion on the upper housing 111 of the main body 110, i.e. to a planar area between the first and second keypads 113a and 113b, for being rotated horizontally with respect to the upper face of the main body 110. The sub-body 160 has a display unit 163 in an upper portion thereof, a receiving unit 167 next to one side of the display unit 163 and a third keypad 165 having function keys at the other side of the display unit 163. The function keys may include conversation start/end buttons, menu buttons for evoking various functions, selection buttons and so on. In the meantime, if the third keypad 165 is not installed, a further expanded size of display unit 163 can be provided.

In this embodiment, the first keypad 113a is constantly exposed regardless of rotation of the sub-body 160. This helps the mobile terminal be used equivalent to a conventional bar or flip type terminal when the sub-body 160 is not rotated, as shown in FIG. 1.

The second keypad 113b is opened/closed according to rotation of the sub-body 160. That is to say, the second keypad 113b is closed when the sub-body 160 is rotated to a position parallel to the main body 110. When the sub-body 160 is rotated to a position perpendicular to the main body 110, the second keypad 113b is opened and thus is usable. Where the second keypad 113b is opened, a user can conveniently input various data and text messages using both of the first and second keypads 113a and 113b of the main body 110.

While the sub-body 160 is rotatable up to 90 degrees according to this embodiment, the sub-body 160 can be alternatively configured to rotate up to an angle exceeding 90 degrees. The first and second keypads 113a and 113b may be set to their own uses different with each other so that the mobile terminal 100 can be used for other various purposes according to the position of the sub-body 160.

Figure 3:
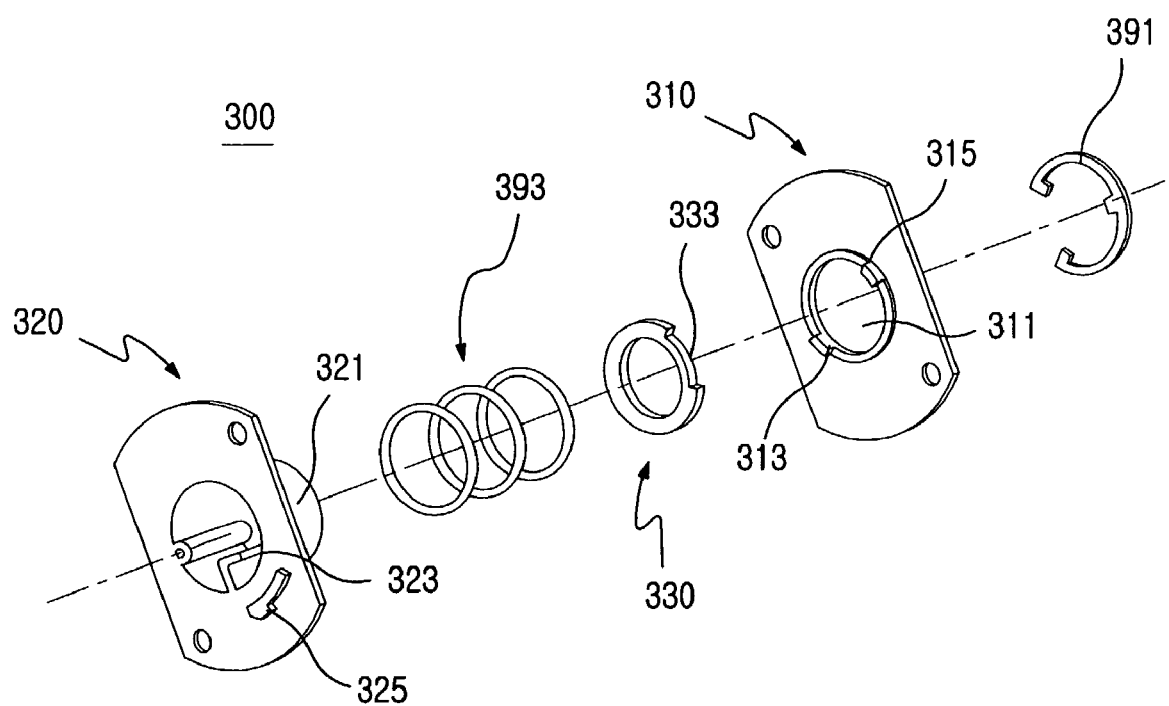
FIG. 3 is an exploded perspective view of a hinge device of the mobile terminal shown in FIG. 1.

FIG. 3 is an exploded perspective view of a hinge device 300 of the mobile terminal 100 shown in FIG. 1. As shown in FIG. 3, the hinge device 300 of the mobile terminal of the invention comprises the first hinge base 310, the second hinge base 320, a wave washer 330, a plurality of spring washers 393 and an E-ring 391.

The first hinge base 310 has a central hinge hole 311 and protrusions 313 and 315 located opposite each other on one side of the hinge hole 311. The protrusion 313 functions as a friction protrusion for generating friction while the hinge device 300 is rotated, and the protrusion 315 functions as a stopper for restricting the rotation range of the second hinge base 320.

The second hinge base 320 has cylindrical hinge shaft 321 extended from a central portion. The second hinge base 320 also has a printed circuit holder 325 projected for a predetermined height from the other side thereof. The printed circuit holder 325 prevents play of a flexible printed circuit 399 (shown in FIG. 9) while the hinge device 300 is operated in the mobile terminal.

Figure 4:
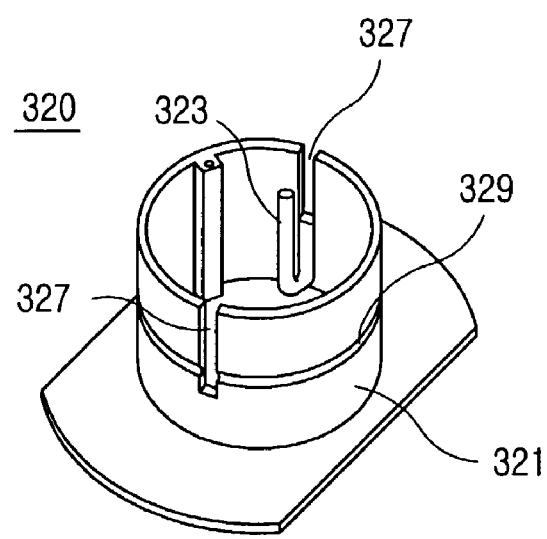
FIG. 4 is a perspective view of the second hinge base of the hinge device shown in FIG. 3.

Referring to FIG. 4, the hinge shaft 321 has a fastening groove 329 formed along a circumference of the outer periphery of the hinge shaft 321. The fastening groove 329 projects through the hinge hole 311 of the first hinge base 310 and the projecting portion is fastened with the E-ring 391. The hinge shaft 321 has slits 327 on both sides thereof and a guide holder 323 extended within the hinge shaft 321 at a predetermined distance from the inside wall.

Figure 9:
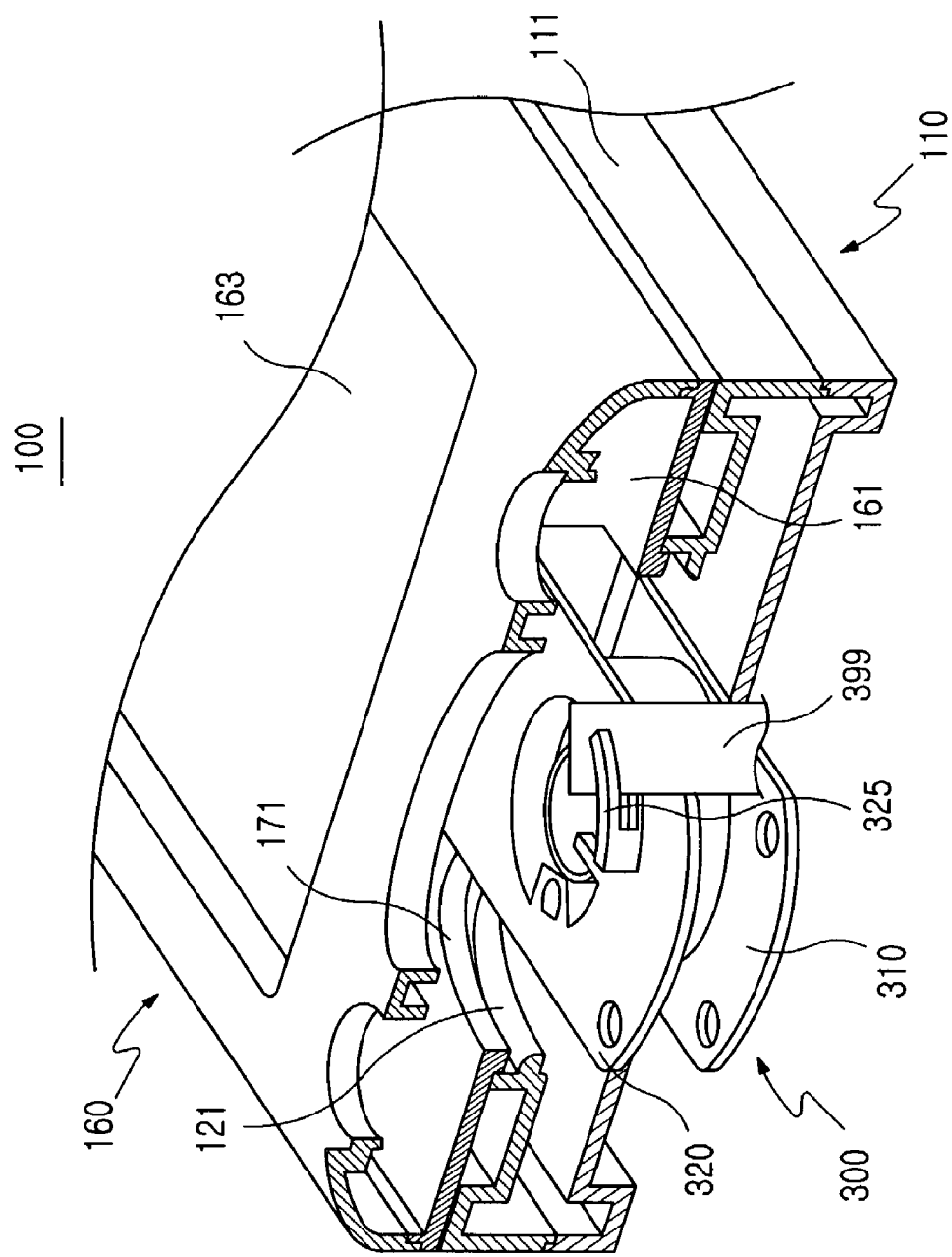
FIG. 9 is a partially broken-away perspective view of the mobile terminal shown in FIG. 1.
Figure 10:
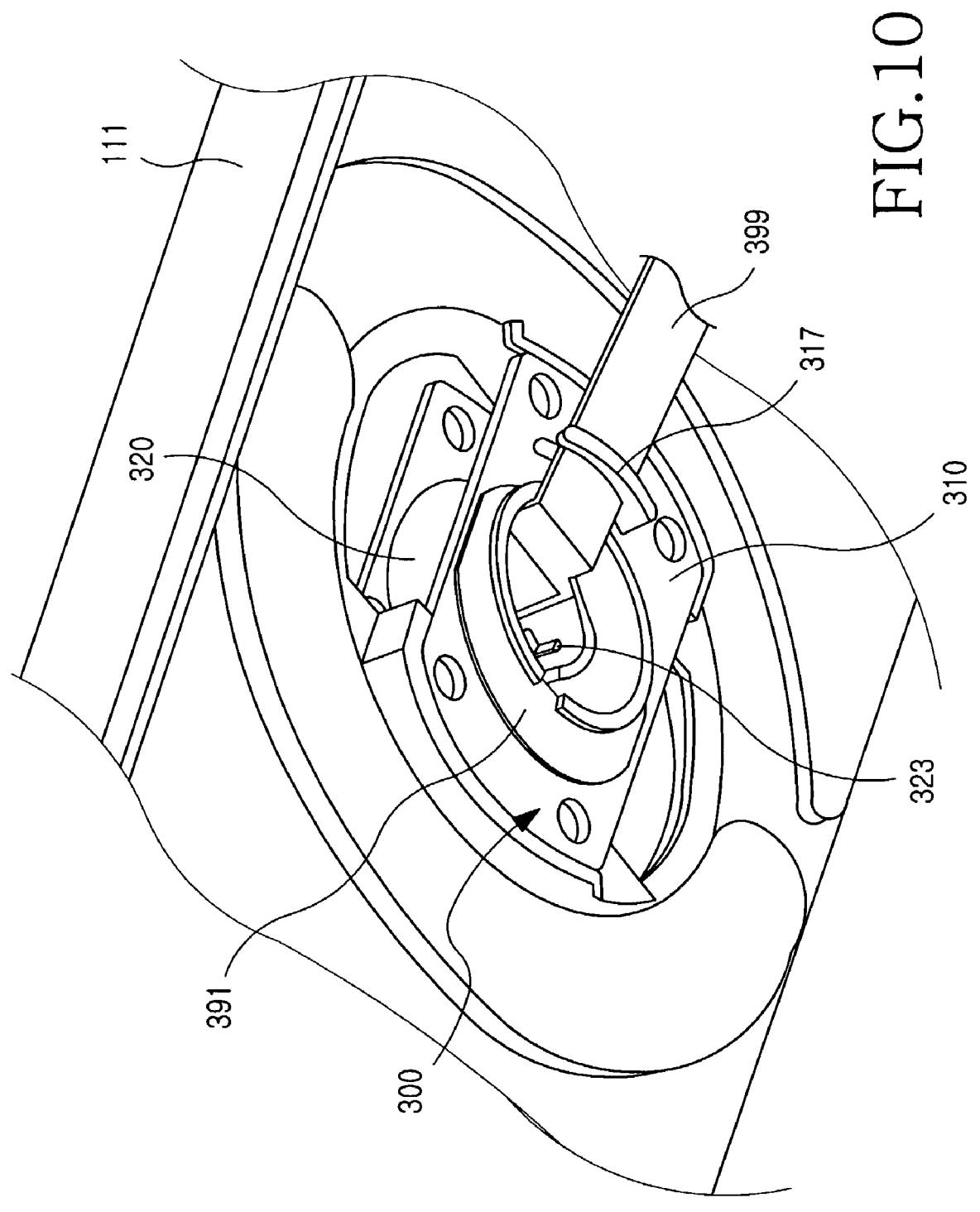

Referring to FIGS. 9 and 10, the flexible printed circuit 399 is wound at least once within the hinge shaft 321 between the inside wall of the hinge shaft 321 and the guide holder 323.

The plurality of spring washers 393 are coupled with the wave washer 330 on the outer periphery of the hinge shaft 321. Therefore, the spring washers 393 and the wave washer 330 are placed between the first hinge base 310 and the second hinge base 320.

The spring washers 393 are bent to have elasticity, and are coupled to the hinge shaft 321 to exert an elastic force toward the end of the hinge shaft 321 in a longitudinal direction.

Figure 5:
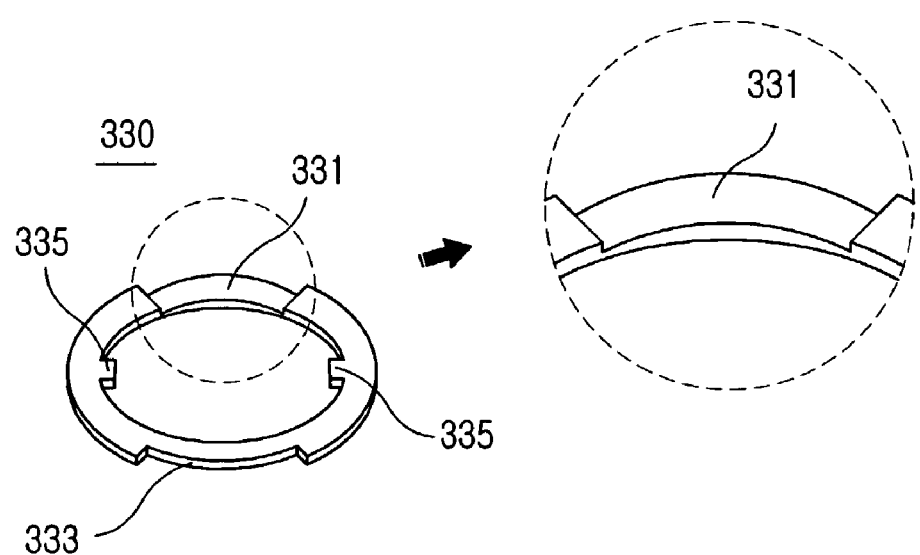
FIG. 5 is a perspective view of a wave washer of the hinge device shown in FIG. 3.

The wave washer 330 has a curved bend 331 in one side, as shown in FIG. 5, to impart friction against the friction protrusion 313 of the first hinge base 310. The wave washer 330 also has a guide groove 333 corresponding to the stopper protrusion 315 of the first hinge base 310 in a proper range of the outer periphery of the wave washer 330. The range of moving the stopper protrusion 315 is restricted by the guide groove 333, and the stopper protrusion 315 is configured to be rotatable in the range of 90 degrees according to this embodiment. Further, the wave washer 330 has protrusions 335 formed in the inner periphery and corresponding to the slits 327 in the hinge shaft 321 so that the wave washer 330 rotates together with the second hinge shaft 320.

Figure 6:
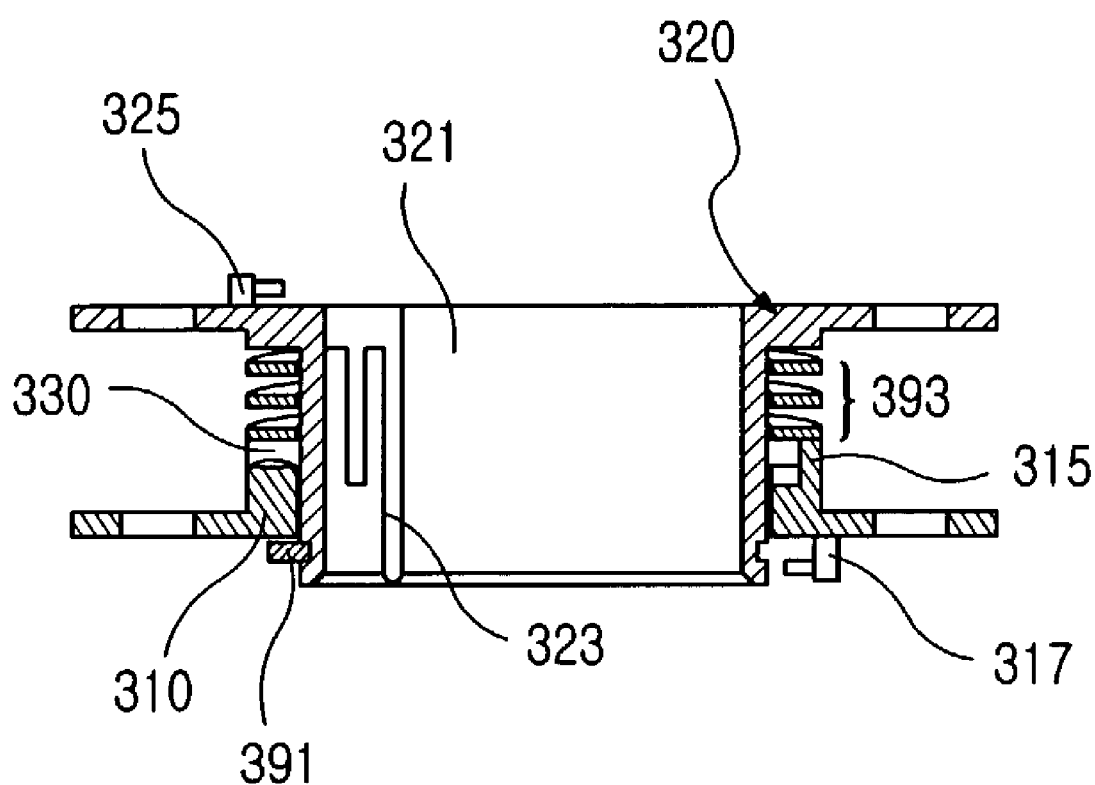
FIG. 6 is a cross-sectional view of the hinge device shown in FIG. 3.

FIG. 6 is a cross-sectional view of the hinge device 300. In FIG. 6, it can be understood that the end of the hinge shaft 321 is extended through the hinge hole 311 of the first hinge base 310 and the E-ring 391 is fastened to the fastening groove 329 so as to couple the first hinge base 310 with the second hinge base 320. On the outer periphery of the hinge shaft 321, the plurality of spring washers 393 are coupled with the wave washer 330.

In the meantime, the first hinge base 310 has a printed circuit holder 317, as the second hinge base 320 has the printed circuit holder 325. The printed circuit holder 317 of the first hinge base 310 is also provided to prevent play of the flexible printed circuit when the second hinge base 320 is rotated.

Figure 7:
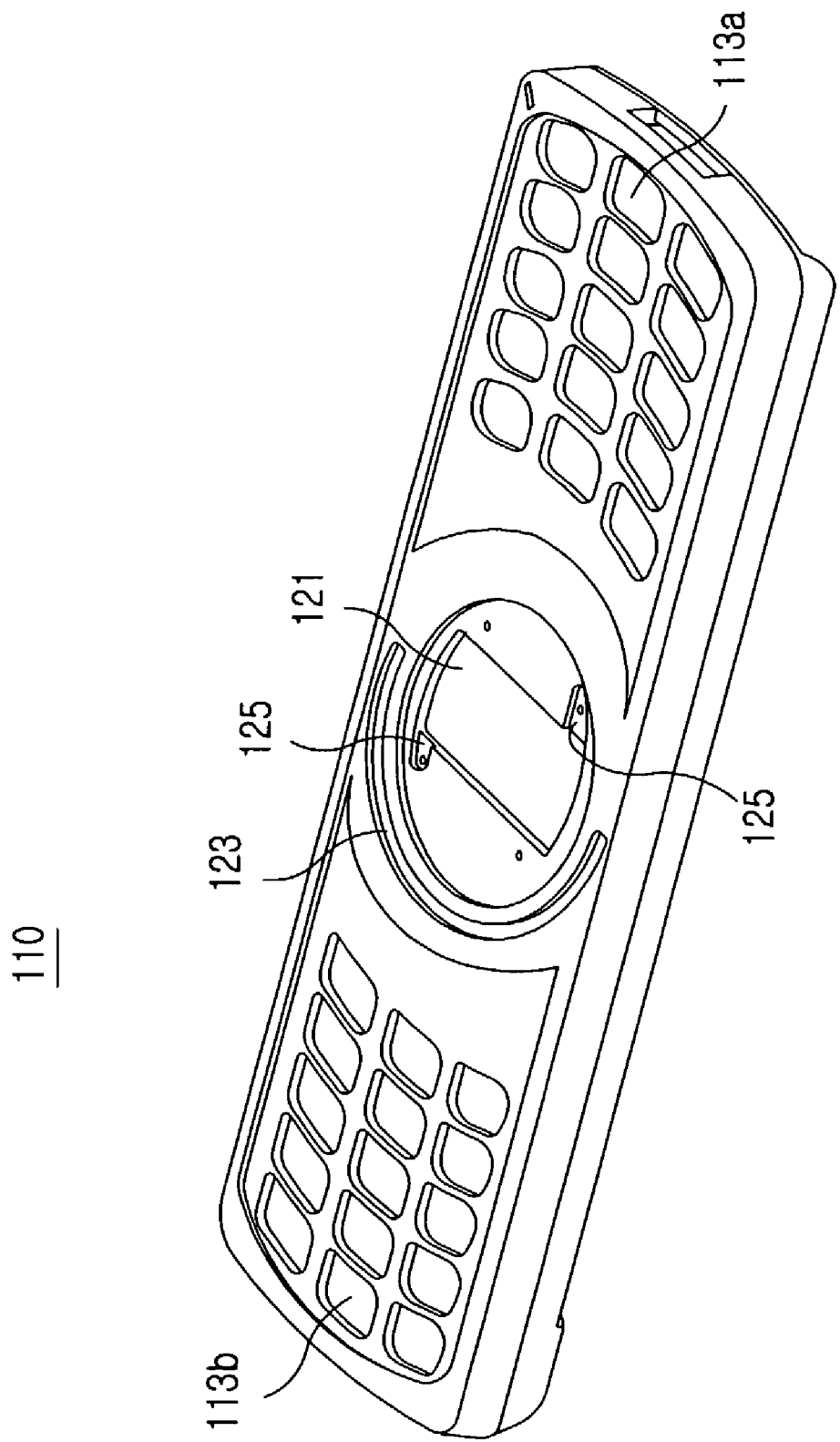
FIG. 7 is a perspective view of a main body of the mobile terminal shown in FIG. 1 with the sub-body removed.

FIG. 7 is a perspective view of the main body 110 of the mobile terminal 100 shown in FIG. 1 with the sub-body 160 removed. As shown in FIG. 7, the main body 110 has the first through-hole 121 in an upper central portion thereof and a semi-circular sliding groove 123 adjacent to the first through-hole 121. Also as described above, the first and second keypads 113a and 113b are provided in the upper face of the main body 110 on both sides of the upper central portion.

Figure 8:
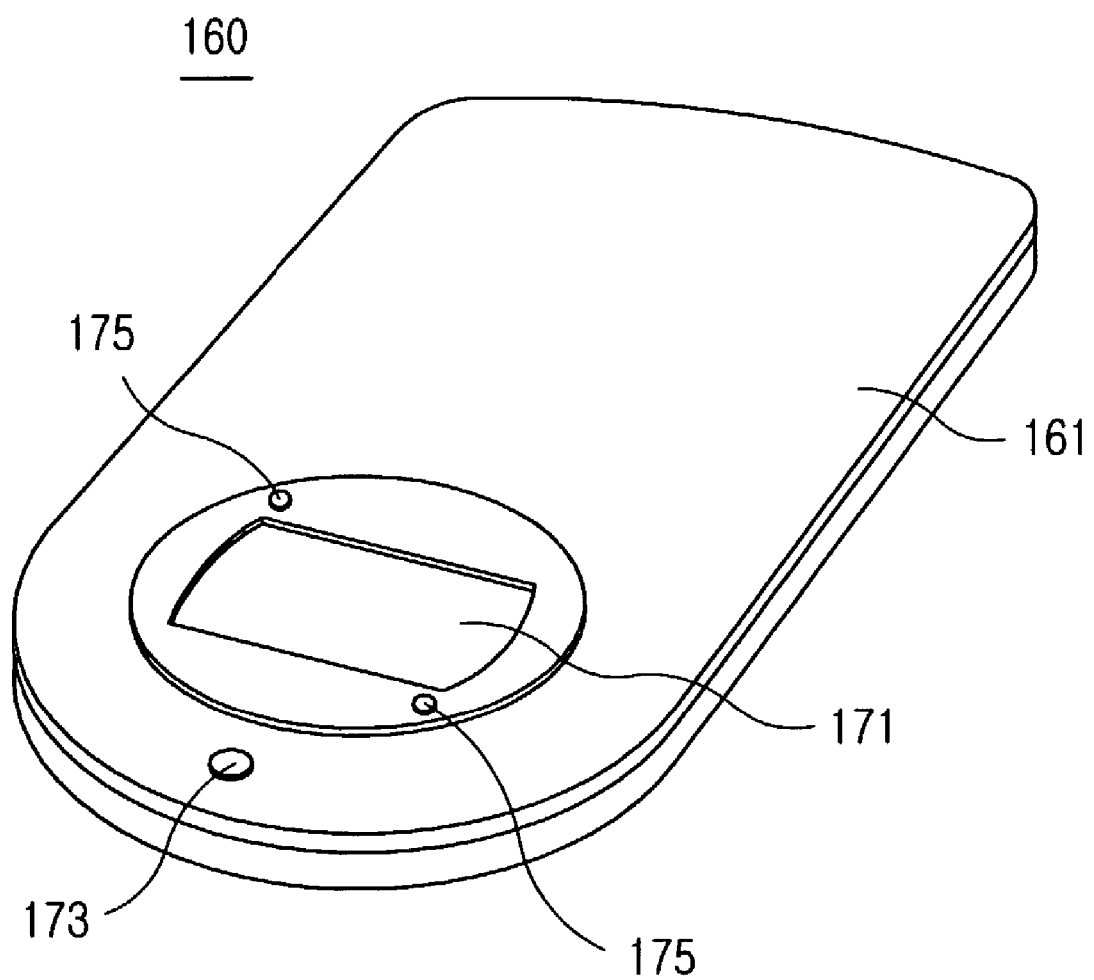
FIG. 8 is a perspective view of a sub-body of the mobile terminal shown in FIG. 1.

FIG. 8 is perspective view of the sub-body 160 of the mobile terminal 100 viewed from the side of a lower housing 161 of the sub-body 160. The lower housing 161 of the sub-body 160 is provided in one side with a second through-hole 171 that communicates with the first through-hole 121 of the main body 110. In the lower end of the lower housing 161 of the sub-body 160, a sliding protrusion 173 is provided that corresponds to the sliding groove 123 in the upper face of the main body 110. The sliding protrusion 173 can reciprocate within the sliding groove 123, and the sliding groove 123 is so constructed that the sliding protrusion 173 can be rotated in the range of 180 degrees.

In order to restrict the rotation range of the sub-body 160, it can be so constructed to restrict the range of mutual rotation between a pair of grooves 125, which are adjacent to the first through-hole 121, and a pair of protrusions 175, which are adjacent to the second through-hole 171. That is, constructions of the sliding groove 123 and the sliding protrusion 173 and of the groove 125 adjacent to the first through hole 121 and the protrusions 175 adjacent to the second through hole 171 restrict the rotation range of the sub-body 160 to 90 degrees with respect to the main body 110.

While the sub-body 160 is rotatable in the range of 90 degrees in this embodiment, it is apparent that the sub-body 160 can be rotatable in the range of 180 or 270 degrees depending on the constructions of the sliding groove 123 and the sliding protrusion 173 and of the groove 125 and the protrusions 175.

FIG. 9 is a partially broken-away perspective view of the mobile terminal 100 shown in FIG. 1, and FIG. 10 is a perspective view of the interior of the main body 110 of the mobile terminal 100 shown in FIG. 1. As shown in FIGS. 9 and 10, the first hinge base 310 is installed on the first through-hole 121 in the upper housing 111 of the main body 110, and the second hinge base 320 is installed on the second through-hole 171 in the lower housing 161 of the sub-body 160. The first hinge base 310 is installed inside the main body 110, and the second hinge base 320 is installed inside the sub-body 160.

The hinge hole 311 of the first hinge base 310 is exposed through the first through-hole 121, and the hinge shaft 321 of the second hinge base 320 is arranged to protrude through the second through hole 171. Upon coupling the main body 110 to the sub-body 160, the end of the hinge shaft 321 projects through the second through-hole 171 and extends through the hinge hole 311 of the first hinge base 310 into the main body 110. Therefore, the E-ring 391 can be fastened to the fastening groove 329 in the end of the hinge shaft 321.

The E-ring 391 acts to mutually fasten the first and second hinge bases 310 and 320 which are respectively installed inside the main and sub-bodies 110 and 160, so that the sub-body 160 is coupled to the main body 110 in a manner horizontally rotatable with respect to the upper face of the main body 110.

Although not shown in the drawings, it is understood that the main body 110 and the sub-body 160 each have various electric circuits therein. That is, the main body 110 is equipped with a main board having circuitry for operation of the terminal, and the sub-body 160 is equipped with circuitry for operation of the display unit, a speaker device and the like. Therefore, the flexible printed circuit 399 is used for connecting the electric circuitry which are respectively installed in the main body 110 and the sub-body 160.

Referring to FIG. 10, the flexible printed circuit 399 extends from the main board (not shown) of the main body 110 and is fixed to the printed circuit holder 317 in the first hinge base 310. The flexible printed circuit 399 further extends up to the hinge shaft 321 of the second hinge base 320 and then is bent into the hinge shaft 321. The flexible printed circuit 399 is wound for at least one time within the hinge shaft 321, in particular, to pass between the guide holder 323 in the hinge shaft 321 and the inside wall of the hinge shaft 321. The flexible printed circuit 399 has this construction in order to ensure a sufficient length thereof so that tensile force owing to rotation of the sub-body 160 is not applied to the flexible printed circuit. Also the guide holder 323 is provided in order to prevent excessive play of the flexible printed circuit within the hinge shaft 321.

Referring to FIG. 9, after being wound within the hinge shaft 321, the flexible printed circuit 399 is re-bent into the sub-body 160 to be connected with the electric circuitry (not shown) in the sub-body 160. The flexible printed circuit 399 bent within the sub-body 160 is fixed to the printed circuit holder 325 of the second hinge base 320.

Even if the sub-body 160 is rotated, the play of the flexible printed circuit 399 is limited to the restricted range of the portion wound in the hinge shaft 321.

Resultantly, the hinge device of the mobile terminal of the invention also provides a manner for connection of the flexible printed circuit while maintaining rotatable coupling of the main body and the sub-body.

As set forth above, the mobile terminal of the invention provides a novel design of mobile terminal by means of installing the keypads separately in both sides of the main body and coupling the sub-body in the central portion of the main body in a manner horizontally rotatable to the upper face of the main body for opening/closing one of the keypads in the sides of the main body. Furthermore, the keypads at both sides can be used together when the sub-body is rotated to 90 degrees in respect to the main body so that a user can rapidly input information by a larger quantity with the keypads of the mobile terminal without any additional input device.

Although the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile terminal comprising:
   a main body;
   a sub-body coupled to said main body in a slidingly rotatable manner relative to an upper face of said main body;
   a first keypad disposed with a plurality of keys in the upper face of said main body at one side of a central portion of said upper face of main body;
   a second keypad disposed with a plurality of keys in the upper face of said main body at an other side of the central portion; and
   a planar area disposed in the central portion, to which said sub-body is rotatably connected, whereby one of said first and second keypads is opened and closed according to rotation of said sub-body.

2. The mobile terminal in accordance with claim 1, wherein said sub-body is rotated in the range of about 0 to 90 degrees with respect to said main body.

3. The mobile terminal in accordance with claim 1, wherein one of said first and second keypads is constantly exposed regardless of rotation of said sub-body.

4. The mobile terminal in accordance with claim 1, further comprising: a display unit in an upper face of said sub-body; and a third keypad at one side of said display unit.

* * * * *